April 7, 1942. J. D. MINER, JR., ET AL 2,279,240
VIBRATING-CONTACT MOTOR
Filed Jan. 10, 1940

WITNESSES:
E. A. McCloskey
Nm. C. Groome

INVENTORS
John D. Miner, Jr. and
Walter Schaelchlin.
BY
ATTORNEY

Patented Apr. 7, 1942

2,279,240

UNITED STATES PATENT OFFICE 2,279,240

VIBRATING-CONTACT MOTOR

John D. Miner, Jr., Lima, Ohio, and Walter Schaelchlin, Wilkinsburg, Pa., assignors to Westinghouse Electric & Manufacturing Company, East Pittsburgh, Pa., a corporation of Pennsylvania Application January 10, 1940, Serial No. 313,248

12 Claims. (Cl. 172—36)

Our invention relates to improvements in vibrating-contact electric motors of the type which has become common in electric shavers, although our invention is not limited to such use of the motor. The motor to which our invention relates consists essentially of an electromagnet, a rotatable armature, so shaped and positioned in the field of the magnet, that the torque produced by the action of the magnet upon the armature would be alternately clockwise and counter-clockwise if the armature were mechanically rotated while the field-magnet was constantly excited without any interruptions in its excitation, and a pair of contacts in circuit with the electromagnet and so interlocked with the armature-position that the magnet-circuit is open, so as to deenergize the magnet, at times when the torque would otherwise be negative with respect to a desired direction of rotation. An extremely small capacitor is usually, but not necessarily, connected across the contacts to reduce the contact-temperature in this type of motor.

The object of our invention is to provide various means for improving the operation of such vibrating-contact motors.

More specifically, an object of our invention is to provide various means for limiting the heating and the erosion of the contacts of such a motor, and for obtaining an increased motor-torque, a reduced motor-heating, and an increased contact-life of the motor.

With the foregoing and other objects in view, our invention consists in the parts, elements, combinations, circuits, systems and methods hereinafter described and claimed, and illustrated in the accompanying drawing, wherein:

Figures 1, 2, 3:
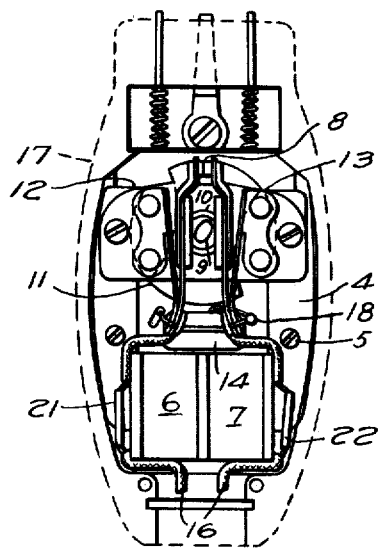
Figure 1 is an elevational view of a motor embodying our invention, in a preferred form of embodiment.
Fig. 2 is an elementary circuit diagram of the motor shown in Fig. 1.
Fig. 3 is an elementary circuit diagram illustrating a slight modification.

In Figure 1, we illustrate our motor as a two-pole motor having a U-shaped field magnet member 4 which is built up of a stack of magnetizable laminations suitably held together. The field-magnet laminations 4 are energized by a winding which, in the particular form illustrated, is split into two field-magnet coils 6 and 7. The two coils 6 and 7 are connected in series with each other, through a pair of contacts 8 of non-arcing tip-material, such as tungsten. The contacts 8 are periodically spread apart by a cam 9 on a motor-shaft 10 which carries the motor-armature 11, consisting of a magnetizable two-pole member which cooperates with the stator poles 12 and 13, at the respective ends of the U-shaped laminated field-magnet structure 4, so that the respective poles of the armature 11 are drawn forward as they approach the respective field-poles 12 and 13, and are retarded as they recede therefrom, the attracting and retarding forces being dependent upon the relative degrees of magnetization of the field-magnet member at the respective moments. In order to reduce sparking at the contacts 8, said contacts are shunted by a capacitor 14.

The motor, as thus far specifically described, is old, and operates by having the contacts 8 close, when the armature-poles are approaching the stator-poles 12 and 13 of the field-magnet frame, the contacts 8 being opened when the armature-poles are about to recede from the stator-poles. Such a motor operates practically equally well on alternating current and direct current, the electrical energy being applied to the motor-terminals 16, which are the terminals of the coils 6 and 7. Such motors commonly attain high speeds of the order of 7000 revolutions per minute. Each time that the contacts 8 are opened, in motors as heretofore constructed, a major portion of the magnetic energy which is stored in the coils 6 and 7 has been dissipated at these contacts, although a portion of this energy has been absorbed in the capacitor 14. The dissipation of energy, in the form of arcing at the contacts 8, has generated an intense heat in a highly concentrated area, occasionally resulting in actually burning a hole in the molded cover of the shaver, this cover being indicated in dotted-line outline, at 17 in Fig. 1.

The contact-gap characteristics tend to be unstable, because excessive heating of the contacts decreases the arcing-voltage that can be maintained across the gap when the contacts are open, and the lower arcing-voltage will cause the capacitor 14 to receive a smaller portion of the energy which is stored in the magnetic circuit, thereby leaving a greater amount of this stored energy to be dissipated in the form of arcing at the contacts 8. This increased energy-dissipation at the contacts increases the net loss in the motor, causing the motor to draw more current from the line, and thus increasing the amount of magnetic energy which there is, to be dissipated at the contacts. At the same time, the effect of the excessive arcing at the contacts is to delay the deenergization of the field-magnet, so that the armature will be retarded as its poles are receding from the field-magnet poles, thus decreasing the output or torque of the motor.

The foregoing limits to performance, in motors as previously constructed, are a severe handicap in shavers which operate at from 110 to 120 volts, as a consequence of which most shavers are designed so as to have less power than would be desirable, because the only effective way previously known, for reducing the heating, was to reduce the power of the motor. At higher voltages, it has been progressively more difficult to control the dissipation of the magnetic energy, so that it has generally been considered, heretofore, that a 220-volt shaver-motor of the vibrating-contact type cannot be built to operate at a satisfactory temperature.

Efforts have been made, to be sure, to absorb more of the stored magnetic energy in the capacitor, by increasing the size of the capacitor, but such efforts have been unsuccessful because a capacitor which was large enough to materially reduce the contact-temperature would invariably result in a rapid erosion of the contact-surfaces, and it would also produce very high inductive voltage-kicks or surges, making it extremely difficult to provide sufficient insulation for either the capacitor or the turns of the magnet-coils.

According to our analysis of the problem of the shunting capacitor 14, in shunt with the contacts 8, the difficulties are progressive, in that the current drawn by the capacitor is dependent, not only upon the size of the capacitor, but also upon the rate of change of the voltage across the contacts. When the contacts first begin to open, a tiny arc invariably appears across the gap separating the contacts. This tiny spark or arc has a certain voltage, and this voltage is impressed across the capacitor and causes it to carry some current. As the contact-separation increases, the arc-voltage increases, and when the arc is extinguished, the voltage across the contact-gap will still further increase, so that, if the arc could be put out substantially instantaneously, a relatively small capacitor would suffice to absorb the current which was being carried by the magnet-coils 6 and 7 at the moment when the contacts 8 opened. In order to extinguish the contact-arc promptly, however, a certain size of capacitor is, in general, needed.

At the other end of the contact-cycle, however, as we analyze the situation, that is, when the contacts 8 close, the capacitor-terminals are suddenly short-circuited by the contacts, resulting in an extremely rapid decrease in the capacitor-voltage, and causing heavy discharge-currents which, we believe, have been the cause of the rapid erosion of the contact-tips when attempts have been made, in the past, to utilize a capacitor which was large enough to practically extinguish the arcs which were produced when the contacts first opened.

In accordance with an important feature of our invention, we connect, in series with the contact-shunting capacitor 14, a resistor 18, of a value suitable for limiting the discharge-currents of the capacitor to a sufficiently small value which will not result in erosion of the contact-tips 8 when the contacts close, suddenly short-circuiting the charged capacitor. The serially connected capacitor 14 and resistor 18 thus constitute our contact-shunting circuit which is shunted across the pair of contacts 8. This erosion-preventing resistor 18, in combination with a capacitor 14 of sufficient size to materially curtail the arcing (and hence the heating) at the contacts 8, should not be confused with the much smaller resistors, which have heretofore been utilized in an effort to reduce radio-interference, but which were not designed or adapted to reduce the wattage and increase the power of the motor, making the motor run cooler, with more torque, and with an enormously increased life of its contact-members.

When the value of the capacitance of the contact-shunting capacitor 14 is increased to the point where it very materially reduces the sparking at the contacts 8, it generally follows that there is experienced a considerable increase in the voltage which appears across the contacts 8 when they are opened, and when the arc thereacross has been interrupted by reason of the transfer of the current to the capacitor 14. This increase in the voltage across the open contact-tips introduces further problems, because it necessitates the choice of a capacitor 14 which is rated at a higher voltage, corresponding to the voltage which appears across the contact-tips 8, and it also necessitates an increase in the insulation which is required by the adjacent turns of the magnet-coils 6 and 7.

As a part of our invention, we frequently prefer, therefore, to utilize some sort of field-discharge resistance-means for limiting the voltage which can appear across the magnet-coils 6 and 7, or across the gap 8. There are essentially two available places for connecting such field-discharging resistance; in Fig. 1 and Fig. 2 we connect separate resistors 21 and 22, respectively, across the respective magnet-coils 6 and 7. In Fig. 3, we show a single resistor 23 which is shunted across the contacts 8. In either case, the field-discharge resistors make it absolutely impossible for the voltage across the resistor-terminals to exceed the voltage-drop which would be produced if the entire current which is drawn by the coil were passed through the resistance, because the entire coil-current does not flow through the resistance, it being shunted by the contact-gap 8 and by the contact-shunting circuit comprising the capacitor 14 and the resistor 18.

While we are obviously not limited to any precise values of the constants, particularly in connection with the broader features of our invention, we shall mention a specific design, and specific limits, which we have found to be helpful in solving the design-problems. For example, in a 220-volt motor, connected as shown in Fig. 2, we have found that the wattage could be decreased from more than 15 watts, which is about twice the maximum amount of power which can be used for a motor to be held in the hand, without uncomfortable heating, to as low as 5 watts, in some instances, by adopting the various expedients of our invention. We prefer to use a capacitor 14 having a mica dielectric, that is to say, a dielectric having a relatively low resistance-loss, the preferred size of the capacitor, for the motor in question, being .002 microfarad, or any value larger than .0015 microfarad. If we had utilized a capacitor 14 having a paper dielectric, that is to say, a dielectric which inherently has relatively high resistance-losses, we could utilize a much larger capacitor, say, a .015 microfarad capacitor, without any series resistor 18. With the small mica capacitor 14, we prefer to utilize a resistor 18 of from 100 to 500 ohms resistance, an intermediate value of 300 ohms being usually chosen, although this value is not critical, and resistance-values slightly smaller or greater than these limits could undoubtedly be tolerated. The field-discharge resistors 21 and 22 are resistors of the smallest ohmic values that will stand being impressed with the line-voltage or such overvoltages as the motor is rated to stand. These resistors should preferably draw an amount of energy which is quite small as compared to the energy drawn by the motor as a whole. We prefer to utilize ½ watt resistors of 30,000 ohms, for the particular motor which is illustrated. If these field-discharge resistors 21 and 22 had not been utilized, we would obtain contact-gap voltages of the order of 3300 to 3500 volts, peak values, when the contacts opened, thus requiring high insulation between the turns of the magnet-coils 6 and 7, and also requiring a 3500-volt capacitor 14. With the field-discharge resistors 21 and 22 as described, this peak contact-gap voltage has been reduced to 2200 volts.

In general, while our invention, in its broadest aspects, is not limited to any particular size of motor, or any particular magnitude of capacitor 14 or resistors 18, 21, 22 or 23, provided that the hereinabove described functional relationships are substantially preserved, we believe that our invention has its most important application to the described type of motors in which the electric field-winding circuit 6-7 draws from 5 to 15 watts when energized from a circuit of from 100 to 260 volts during the normal operation of the motor, the capacitance of the contact-shunting circuit 14-18 is .0015 microfarad or more, the resistance of said contact-shunting circuit 14-18 is of the order of from 100 to 500 ohms, or slightly more or less, and the field discharge resistance-means 21-21 or 23 draws energy of the order of one-half watt.

While we have described our invention in two preferred forms of embodiment, and while we have mentioned certain specific design-limits, we desire it to be understood that we are not limited to these precise details, as various changes may obviously be made by those skilled in the art without departing from our invention, at least in its broader aspects. We desire, therefore, that the appended claims be accorded the broadest construction consistent with their language and the prior art.

We claim as our invention:

1. An electric motor comprising a field-magnet member and an armature member which are relatively rotatable, one with respect to the other, said field-magnet member comprising a laminated magnetizable core and an electric field-winding circuit for producing poles disposed in operative relation to the armature member, said armature member being of such magnetic characteristics, and so positioned with respect to the field poles, that the torque produced by the action of the field poles on the armature member would be alternately clockwise and counter-clockwise if relative rotation of the armature member were established with respect to the field-magnet member while the electric field-winding circuit was continuously energized, a pair of contacts in the field-winding circuit, means for so opening and closing said contacts, in relation to the relative position of the armature member with respect to the field poles, that the contacts are open at times when the torque would otherwise be negative with respect to a desired direction of rotation, and a contact-shunting circuit connected in shunt to said contacts, said contact-shunting circuit comprising, in effect, a capacitance which is sufficiently large to momentarily transfer the current of the field-winding circuit from the contacts to the shunting circuit when the contacts are opened, and a resistance in series-circuit relation to said capacitance, and included in said contact-shunting circuit, said resistance being sufficiently large to so limit the rate of discharge of the capacitor as to prevent rapid eroding of the contact-points when the contacts are closed.

2. An electric motor comprising a field-magnet member and an armature member which are relatively rotatable, one with respect to the other, said field-magnet member comprising a laminated magnetizable core and an electric field-winding circuit for producing poles disposed in operative relation to the armature member, said armature member being of such magnetic characteristics, and so positioned with respect to the field poles, that the torque produced by the action of the field poles on the armature member would be alternately clockwise and counter-clockwise if relative rotation of the armature member were established with respect to the field-magnet member while the electric field-winding circuit was continuously energized, a pair of contacts in the field-winding circuit, means for so opening and closing said contacts, in relation to the relative position of the armature member with respect to the field poles, that the contacts are open at times when the torque would otherwise be negative with respect to a desired direction of rotation, a contact-shunting circuit connected in shunt to said contacts, said contact-shunting circuit comprising, in effect, a capacitance which is sufficiently large to momentarily transfer the current of the field-winding circuit from the contacts to the shunting circuit when the contacts are opened, and a resistance in series-circuit relation to said capacitance, and included in said contact-shunting circuit, said resistance being sufficiently large to so limit the rate of discharge of the capacitor as to prevent rapid eroding of the contact-points when the contacts are closed, and field-discharge resistance-means so connected as to absorb some of the field-winding current which would otherwise flow through the capacitance when the contacts are opened, said field-discharge resistance-means being of such high resistance that it would take an appreciable, but small, fraction of the energy consumed by the field-winding circuit if said resistance-means were continuously connected across the supply-circuit terminals of said field-winding circuit.

3. An electric motor comprising a field-magnet member and an armature member which are relatively rotatable, one with respect to the other, said field-magnet member comprising a laminated magnetizable core and an electric field-winding circuit for producing poles disposed in operative relation to the armature member, said armature member being of such magnetic characteristics, and so positioned with respect to the field poles, that the torque produced by the action of the field poles on the armature member would be alternately clockwise and counter-clockwise if relative rotation of the armature member were established with respect to the field-magnet member while the electric field-winding circuit was continuously energized, a pair of contacts in the field-winding circuit, means for so opening and closing said contacts, in relation to the relative position of the armature member with respect to the field poles, that the contacts are open at times when the torque would otherwise be negative with respect to a desired direction of rotation, and a contact-shunting circuit connected in shunt to said contacts, characterized by the electric field-winding circuit drawing from 5 to 15 watts when energized from a circuit of from 100 to 260 volts during the normal operation of the motor, the capacitance of said contact-shunting circuit being .0015 microfarad or more, and the resistance of said contact-shunting circuit being of the order of from 100 to 500 ohms, or slightly more or less, said capacitance and resistance of the contact-shunting circuit being in series.

4. An electric motor comprising a field-magnet member and an armature member which are relatively rotatable, one with respect to the other, said field-magnet member comprising a laminated magnetizable core and an electric field-winding circuit for producing poles disposed in operative relation to the armature member, said armature member being of such magnetic characteristics, and so positioned with respect to the field poles, that the torque produced by the action of the field poles on the armature member would be alternately clockwise and counter-clockwise if relative rotation of the armature member were established with respect to the field-magnet member while the electric field-winding circuit was continuously energized, a pair of contacts in the field-winding circuit, means for so opening and closing said contacts, in relation to the relative position of the armature member with respect to the field poles, that the contacts are open at times when the torque would otherwise be negative with respect to a desired direction of rotation, a contact-shunting circuit connected in shunt to said contacts, and field-discharge resistance-means so connected as to absorb some of the field-winding current which would otherwise flow through the capacitance when the contacts are opened, characterized by the electric field-winding circuit drawing from 5 to 15 watts when energized from a circuit of from 100 to 260 volts during the normal operation of the motor, the capacitance of said contact-shunting circuit being .0015 microfarad or more, the resistance of said contact-shunting circuit being of the order of from 100 to 500 ohms, said capacitance and resistance of the contact-shunting circuit being in series, and the field-discharge resistance-means drawing energy of the order of one-half watt.

5. An electric motor comprising an electromagnet having pole-pieces and one or more magnet-coils, a rotatable armature, contacts in series with the magnet-coil or coils and controlled by the position of the armature relative to the pole-pieces of the electromagnet, and a capacitor and resistor aggregate of proper constants to absorb a sufficient proportion of the magnetic energy and to so limit the capacitor-discharge current as to prevent ionization or break-down of the contact-gap under normal operation and, within reasonable limits, under overload or overvoltage operation, the said capacitor and resistor being connected in series across the contacts.

6. An electric motor comprising an electromagnet having pole-pieces and one or more magnet-coils, a rotatable armature, contacts in series with the magnet-coil or coils and controlled by the position of the armature relative to the pole-pieces of the electromagnet, a capacitor and resistor aggregate of proper constants to absorb a sufficient proportion of the magnetic energy and to so limit the capacitor-discharge current as to prevent ionization or break-down of the contact-gap under normal operation and, within reasonable limits, under overload or overvoltage operation, the said capacitor and resistor being connected in series across the contacts, and one or more field-discharge resistors shunted across the magnet-coil or coils so as to limit the field-discharge voltage to a value suitable for the insulation of the coil and of the capacitor.

7. An electric motor comprising an electromagnet having pole-pieces and one or more magnet-coils, a rotatable armature, contacts in series with the magnet-coil or coils and controlled by the position of the armature relative to the pole-pieces of the electromagnet, a capacitor and resistor aggregate of proper constants to absorb a sufficient proportion of the magnetic energy and to so limit the capacitor-discharge current as to prevent ionization or break-down of the contact-gap under normal operation and, within reasonable limits, under overload or overvoltage operation, the said capacitor and resistor being connected in series across the contacts, and field-discharge resistor connected across said contacts to limit the field-discharge voltage to a value suitable for the insulation of the coil and of the capacitor.

8. An electric motor comprising a field-magnet member and an armature member which are relatively rotatable, one with respect to the other, said field-magnet member comprising a laminated magnetizable core and an electric field-winding circuit for producing poles disposed in operative relation to the armature member, said armature member being of such magnetic characteristics and so positioned with respect to the field poles, that the torque produced by the action of the field poles on the armature member would be alternately clockwise and counter-clockwise if relative rotation of the armature member were established with respect to the field-magnet member while the electric field-winding circuit was continuously energized, a pair of contacts in the field-winding circuit, means for so opening and closing said contacts, in relation to the relative position of the armature member with respect to the field poles, that the contacts are open at times when the torque would otherwise be negative with respect to a desired direction of rotation, a contact-shunting circuit connected in shunt to said contacts, and field-discharge resistance-means connected in shunt to the electric field-winding circuit, characterized by the electric field-winding circuit drawing from 5 to 15 watts when energized from a circuit of from 100 to 260 volts during the normal operation of the motor, the capacitance of said contact-shunting circuit being .0015 microfarad or more, the resistance of said contact-shunting circuit being of the order of from 100 to 500 ohms, said capacitance and resistance of the contact-shunting circuit being in series, and the field-discharge resistance-means drawing energy of the order of one-half watt.

9. An electric motor comprising a field-magnet member and an armature member which are relatively rotatable, one with respect to the other, said field-magnet member comprising a laminated magnetizable core and an electric field-winding circuit for producing poles disposed in operative relation to the armature member, said armature member being of such magnetic characteristics and so positioned with respect to the field poles, that the torque produced by the action of the field poles on the armature member would be alternately clockwise and counter-clockwise if relative rotation of the armature member were established with respect to the field-magnet member while the electric field-winding circuit was continuously energized, a pair of contacts in the field-winding circuit, means for so opening and closing said contacts, in relation to the relative position of the armature member with respect to the field poles, that the contacts are open at times when the torque would otherwise be negative with respect to a desired direction of rotation, a contact-shunting circuit connected in shunt to said contacts, and field-discharge resistance-means also connected in shunt to said contacts, characterized by the electric field-winding circuit drawing from 5 to 15 watts when energized from a circuit of from 100 to 260 volts during the normal operation of the motor, the capacitance of said contact-shunting circuit being .0015 microfarad or more, the resistance of said contact-shunting circuit being of the order of from 100 to 500 ohms, said capacitance and resistance of the contact-shunting circuit being in series, and the field-discharge resistance-means drawing energy of the order of one-half watt.

10. An electric motor comprising an electromagnet having pole-pieces and one or more magnet-coils, a rotatable armature, contacts in series with the magnet-coil or coils and controlled by the position of the armature relative to the pole-pieces of the electromagnet, and a contact-shunting circuit connected in shunt to said contacts, characterized by the magnet-coil or coils of the motor drawing from 5 to 15 watts when energized from a circuit of from 100 to 260 volts during the normal operation of the motor, the capacitance of said contact-shunting circuit being .0015 microfarad or more, and the resistance of said contact-shunting circuit being of the order of from 100 to 500 ohms, or slightly more or less, said capacitance and resistance of the contact-shunting circuit being in series.

11. An electric motor comprising an electromagnet having pole-pieces and one or more magnet-coils, a rotatable armature, contacts in series with the magnet-coil or coils and controlled by the position of the armature relative to the pole-pieces of the electromagnet, a contact-shunting circuit connected in shunt to said contacts, and field-discharge resistance-means connected in shunt to the electric field-winding circuit, characterized by the magnet-coil or coils of the motor drawing from 5 to 15 watts when energized from a circuit of from 100 to 260 volts during the normal operation of the motor, the capacitance of said contact-shunting circuit being .0015 microfarad or more, the resistance of said contact-shunting circuit being of the order of from 100 to 500 ohms, said capacitance and resistance of the contact-shunting circuit being in series, and the field-discharge resistance-means drawing energy of the order of one-half watt.

12. An electric motor comprising an electromagnet having pole-pieces and one or more magnet-coils, a rotatable armature, contacts in series with the magnet-coil or coils and controlled by the position of the armature relative to the pole-pieces of the electromagnet, a contact-shunting circuit connected in shunt to said contacts, and field-discharge resistance-means also connected in shunt to said contacts, characterized by the magnet-coil or coils of the motor drawing from 5 to 15 watts when energized from a circuit of from 100 to 260 volts during the normal operation of the motor, the capacitance of said contact-shunting circuit being .0015 microfarad or more, the resistance of said contact-shunting circuit being of the order of from 100 to 500 ohms, said capacitance and resistance of the contact-shunting circuit being in series, and the field-discharge resistance-means drawing energy of the order of one-half watt.

JOHN D. MINER, JR.
WALTER SCHAELCHLIN.